Dec. 16, 1924.

F. A. BENNEFELD

GASOLINE FILTER

Filed April 25, 1923

1,519,479

F. A. Bennefeld,
Inventor

Witnesses:

Attorney

Patented Dec. 16, 1924.

1,519,479

UNITED STATES PATENT OFFICE.

FRANK A. BENNEFELD, OF ADA, MINNESOTA.

GASOLINE FILTER.

Application filed April 25, 1923. Serial No. 634,447.

*To all whom it may concern:*

Be it known that I, FRANK A. BENNEFELD, a citizen of the United States, residing at Ada, in the county of Norman and State of Minnesota, have invented certain new and useful Improvements in Gasoline Filters, of which the following is a specification.

In carrying out the present invention, it is my purpose to provide a filter for gasoline adapted to be installed in the gasoline feed line between the storage tank and carburetor of a motor, for absolutely preventing the entrance of dirt, water or other foreign matter into the carburetor.

A further purpose of the invention is the provision of such a gasoline filter that may be readily installed in set position, and one that will effectively operate under all conditions, the invention being further characterized by its simplicity of construction, efficiency and durability, and that may be manufactured and marketed at relatively small cost.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figures 1, 2:
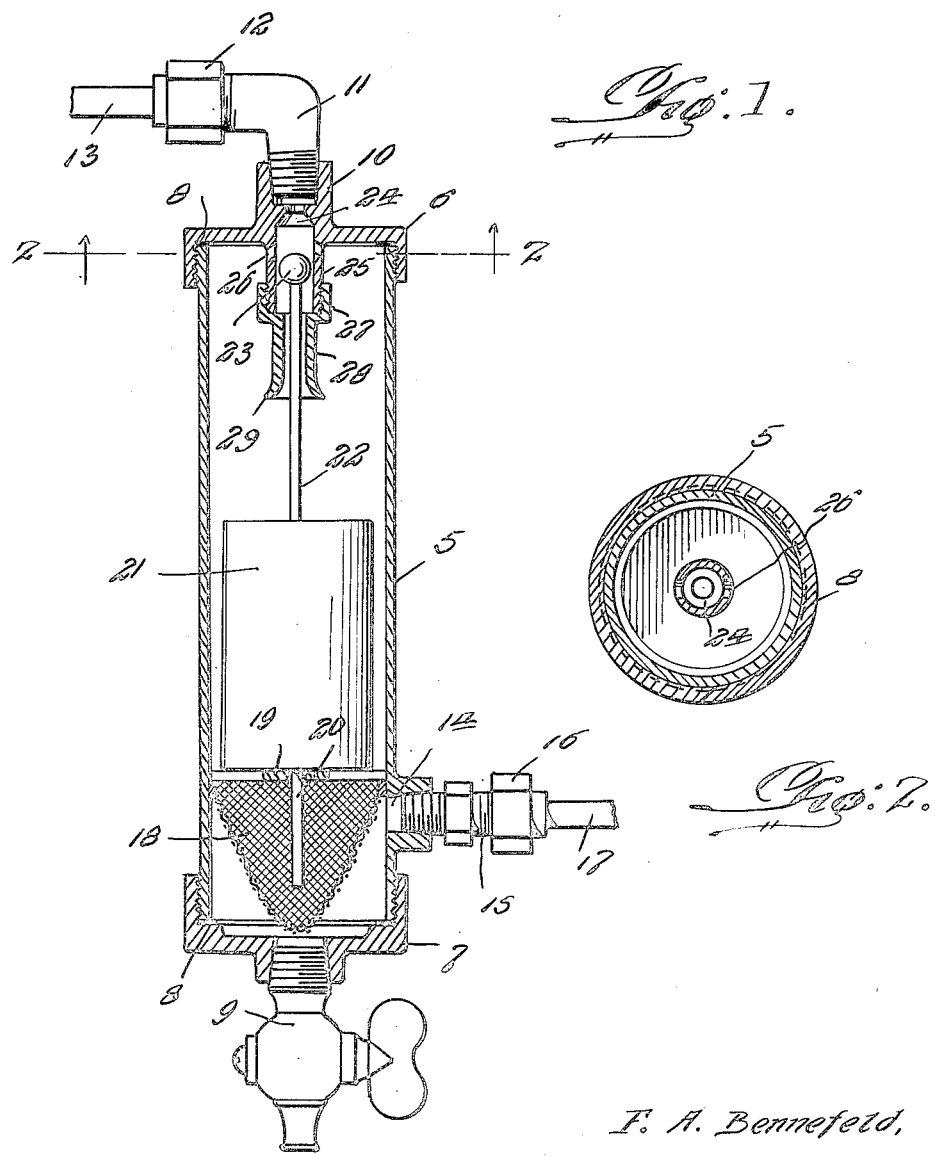
Figure 1 is a vertical sectional view of my improved filter.
Figure 2 is a transverse section taken approximately on line 2—2 of Figure 1.

Referring to the drawings in detail, my filter comprises among other elements, an elongated open ended cylindrical casing 5, externally screw threaded at its opposite ends, and carrying upper and lower cap members 6 and 7, respectively. Between the members 6 and 7 and the opposite ends of the casing 5 are packing rings 8.

The lower cap member 7 is equipped with a pet cock 9 for permitting of the draining of the filter, while the upper cap member 6 is formed with an outlet neck 10, into which is screw threaded one end of an elbow 11, the opposite end of this elbow being coupled at 12 to a gas pipe 13 that extends to the carburetor of a motor vehicle.

Adjacent the lower end of the casing 5, the same is formed with an opening 14, into which is engaged one end of a screw threaded nipple 15, to which is attached, through the medium of a coupling 16, one end of a pipe 17, that extends to the storage tank into the automobile. Within the lower end of the casing 5 is a conical shaped filtering screen 18, and also within this casing above said screen 18 is a flat-like cross rod 19, that is provided with a central opening for permitting of the passage therethrough of a guide rod 20, formed upon the lower end of a float 21. The nature of this float is such as to swing to the position shown in Figure 1, in the presence of gasoline or to rise in the presence of water, the upper end of this float carrying a valve rod 22, that is equipped with a ball valve 23, and adapted to impinge against a seat 24 in the top cap 6, for consequently preventing the discharge of the gasoline from the filter when the float rises upwardly in the presence of water.

The top cap 6 is provided internally with a sleeve 25, that surrounds the seat 24 and effects a guide for the valve 23, this sleeve being provided with openings 26 for obvious purposes. The lower end of the sleeve 25 is externally screw threaded for receiving an internally screw threaded flange 27 of a valve rod guide sleeve 28, the lower end of which is flared outwardly at 29, as clearly shown in Figure 1.

In view of the above description, it will at once be apparent that when the gasoline within the filter is free from water, the float 21 will be in the position shown in Figure 1 for permitting of the discharge of the gasoline from the filter, it being of course also understood that in view of the presence of the filter screen 18 any sediment or foreign matter within the gasoline will be prevented from entering the carburetor. Should water accumulate within the filter, the float 21 will continually rise for closing the outlet of the casing and consequently cutting off the supply of gasoline to the carburetor, at which time, the pet cock may be opened for draining the water therefrom.

The advantages of a device of this character will be readily appreciated by those skilled in the art, and even though I have herein shown and described the preferred embodiment of my invention, it is nevertheless to be understood that minor changes may be made therein without departing from the spirit and scope of the invention as claimed.

Having thus described my invention, what I claim as new, and desire to secure by Letters-Patent is:—

Apparatus for separating water from gasoline comprising a casing provided at its top with a fluid outlet opening and at its lower portion with a fluid inlet opening, a float member located in the casing between said openings and adapted to move vertically in the casing, the specific gravity of the float member being such that it will float upon water and sink in gasoline, a nipple depending from the outlet opening and provided at its side and below the top of the casing with openings, a rod passing centrally through the float, means for guiding the lower portion of the rod, and a ball mounted upon the upper end of the rod and guided in the nipple and adapted to move across the openings in the sides of the nipples and adapted to seat upon the outlet opening of the casing.

In testimony whereof I affix my signature.

FRANK A. BENNEFELD.